United States Patent

[11] 3,563,396

[72] Inventor John Leonard
   Waynesboro, Pa.
[21] Appl. No. 763,653
[22] Filed Sept. 30, 1968
[45] Patented Feb. 16, 1971
[73] Assignee Landis Machine Company
   Waynesboro, Pa.
   a corporation of Pennsylvania

[54] WORKPIECE FEEDING MECHANISM
   1 Claim, 6 Drawing Figs.
[52] U.S. Cl. ................................................ 214/1;
   113/113
[51] Int. Cl. ........................................... B65g 47/06
[50] Field of Search ..................................... 214/1B,
   1B2, 1B3, 1B4, 1BS3, 1BS4, 147T; 72/420;
   113/113

[56] References Cited
UNITED STATES PATENTS

| | | | |
|---|---|---|---|
| 2,991,892 | 7/1961 | Haas | 214/1(B4)UX |
| 3,182,533 | 5/1965 | Gramespacher | 214/1(B4)X |
| 3,428,190 | 2/1962 | Joichi | 214/1(B2) |
| 2,603,178 | 7/1952 | Cahenzli | 113/113X |

Primary Examiner—Gerald M. Forlenza
Assistant Examiner—George F. Abraham
Attorney—Strauch, Nolan, Neale, Nies and Kurz ABSTRACT: Apparatus for feeding workpieces to and removing workpieces from a work forming station, which is typically located between a pair of opposed rolls which rotate about parallel axes. The workpieces are manually or automatically properly oriented and placed in a storage unit and are transferred from the storage unit to the working station and returned to the storage unit.

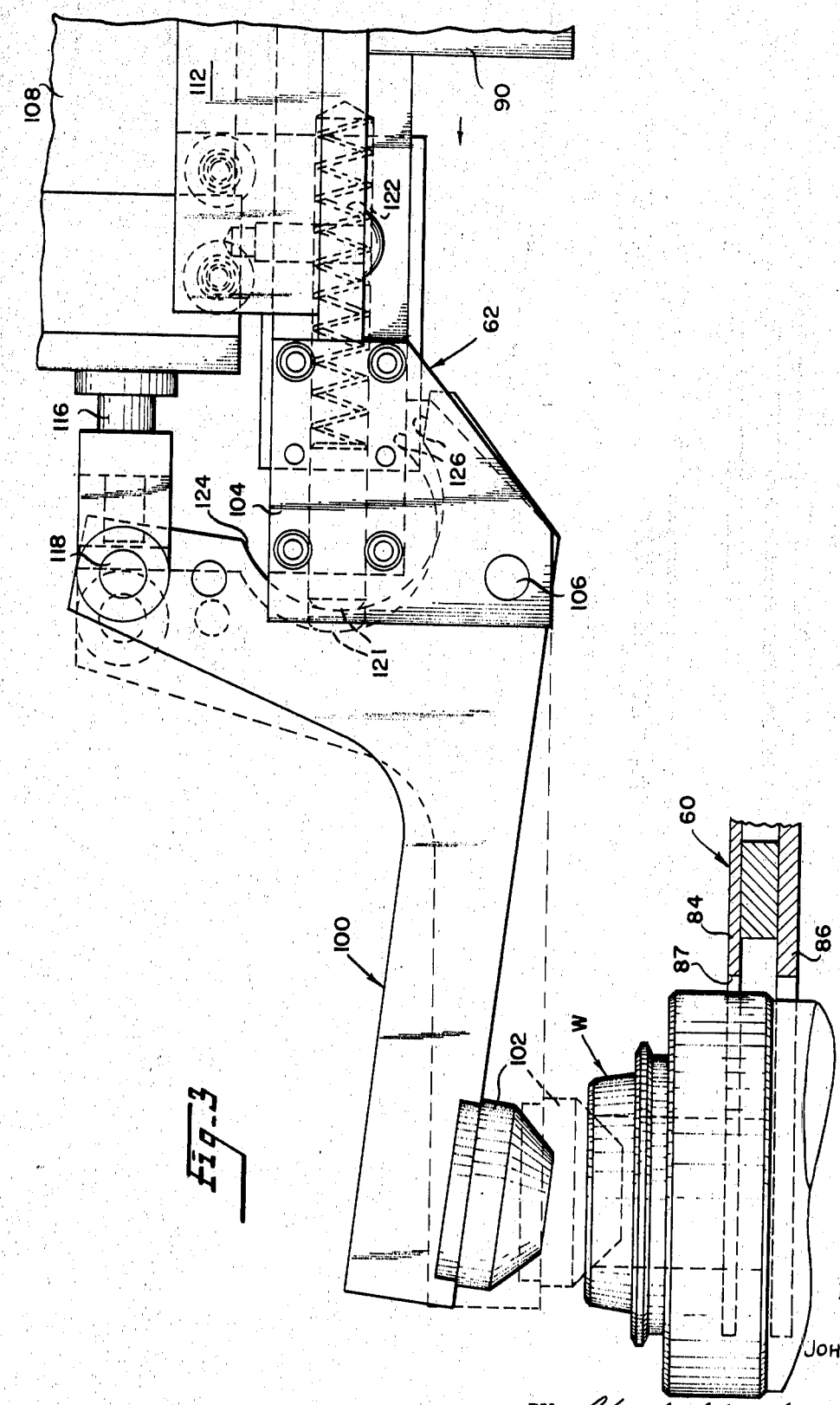

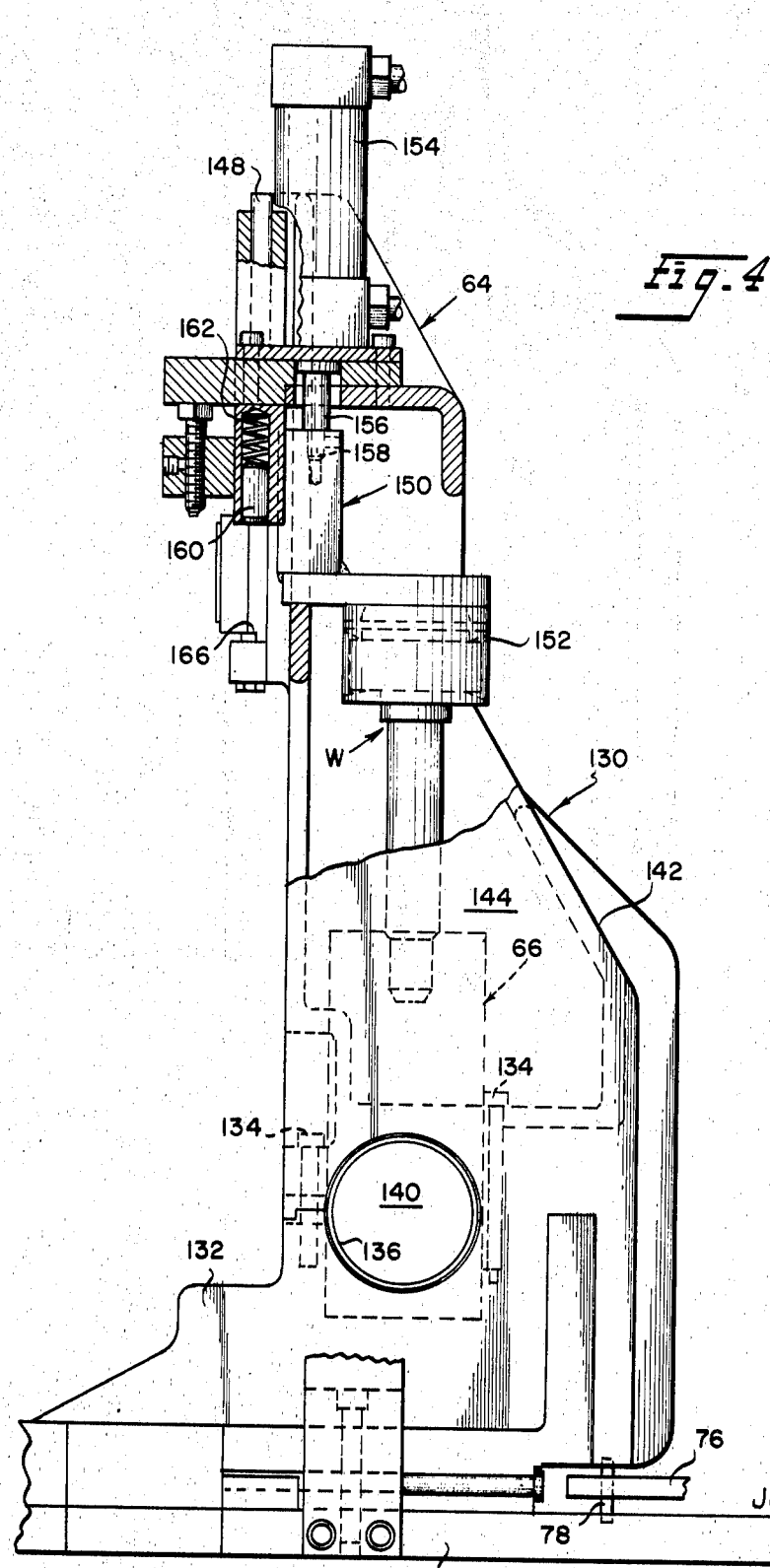

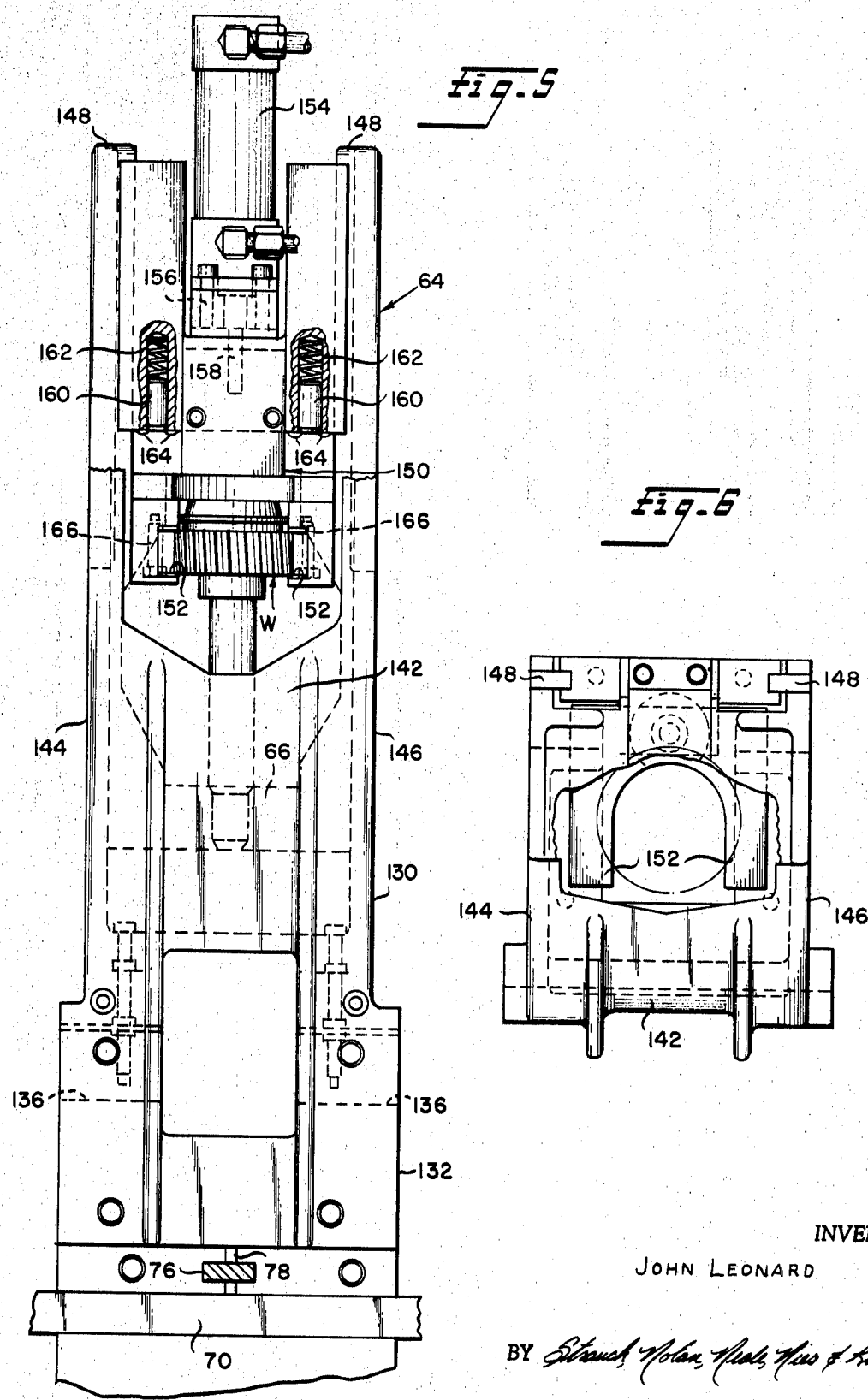

3,563,396

WORKPIECE FEEDING MECHANISM

BACKGROUND OF THE INVENTION

Relatively recent developments in the art of forming workpieces by rolling have made it feasible to use rolling techniques on a mass production basis. One significant development, which permits the roll forming of gears such as those used in automotive transmissions, is disclosed and claimed in copending application Ser. No. 618,750, now abandoned, owned by applicant's assignee. In this apparatus the workpieces are positioned on a mandrel between a pair of opposed rolls rotatable about parallel axes. The workpiece is formed by displacing one roll toward the other to bring both rolls into contact the the workpiece. The rolls are then separated and the workpieces withdrawn and replaced by an unformed workpiece.

In this prior apparatus the workpieces are moved toward and away from the work station by a turret assembly having four equally spaced mandrels. While a workpiece positioned on one of the mandrels is being rolled at the rolling station between the rolls, another workpiece is loaded on the opposite horizontally extending mandrel. The turret assembly is then indexed 90° to carry the finished workpiece away from the rolling station and the new workpiece toward the rolling station. Thus the turret is successively indexed through a series of 90° movements, always moving in the same direction to establish a steady flow of workpieces to and from the rolling station. While this apparatus is in successful operation, it is of somewhat limited application since the turret mechanism can accommodate only workpieces of relatively small size to avoid interference with the work forming rolls and the associated support structure, particularly as the workpieces pass downwardly along the arc extending between the loading station and the forming station. Nevertheless, because of the success of the apparatus and the associated method in the high-speed production of gears, the need has arisen for a work feeding and transfer mechanism for rolling larger workpieces, particularly elongated workpieces, which are beyond the capability of the mechanism disclosed in the aforesaid application.

SUMMARY OF THE INVENTION

It is a principal purpose and object of the present invention to provide an improved work-handling mechanism which meets the foregoing requirements and permits the use of the basic rolling mechanism shown in the aforesaid application Ser. No. 618,750, and similar mechanisms in the mass production of various forms of workpieces having a through bore including elongated workpieces such as gears integrally formed on an elongated support shaft.

In attaining this and ancillary objects, the present invention provides a turret-type mechanism having a single workpiece supporting mandrel. A drive mechanism is provided for indexing the turret between a first position in which the mandrel and the workpiece are disposed at the working station with the mandrel extending essentially horizontally between the forming rolls, and a second position 90° away from the rolling position in which the mandrel extends vertically upward. A second-stage transfer mechanism is provided to deposit a workpiece vertically on the mandrel and to remove the workpiece from the mandrel after the work forming operation has been completed. A third-stage transfer mechanism is effective to move an unformed workpiece from a workpiece storage unit to the second transfer mechanism and to return the finished workpiece to the storage unit from which the finished workpieces may be removed manually or automatically as desired.

It is, accordingly, a further object of the present invention to provide an improved, high-speed work feeding and transfer mechanism which handles workpieces at rates compatible with mass production schedules while protecting the workpieces from damage and which accommodates a variety of sizes and shapes of workpieces and which has a long maintenance-free service life.

Additional objects and advantages will become apparent as the description proceeds.

DESCRIPTION OF DRAWINGS

FIG. 3 is an enlarged fragmentary view illustrating a portion of the apparatus for transferring workpieces from and to the work storage unit;

FIG. 4 is an enlarged fragmentary view, partly in section, of a portion of the apparatus shown in FIG. 2;

FIG. 5 is a side elevation of the apparatus shown in FIG. 4; and

FIG. 6 is a top plan view of the apparatus shown in FIGS. 4 and 5.

DESCRIPTION OF PREFERRED EMBODIMENT

Figure 1:
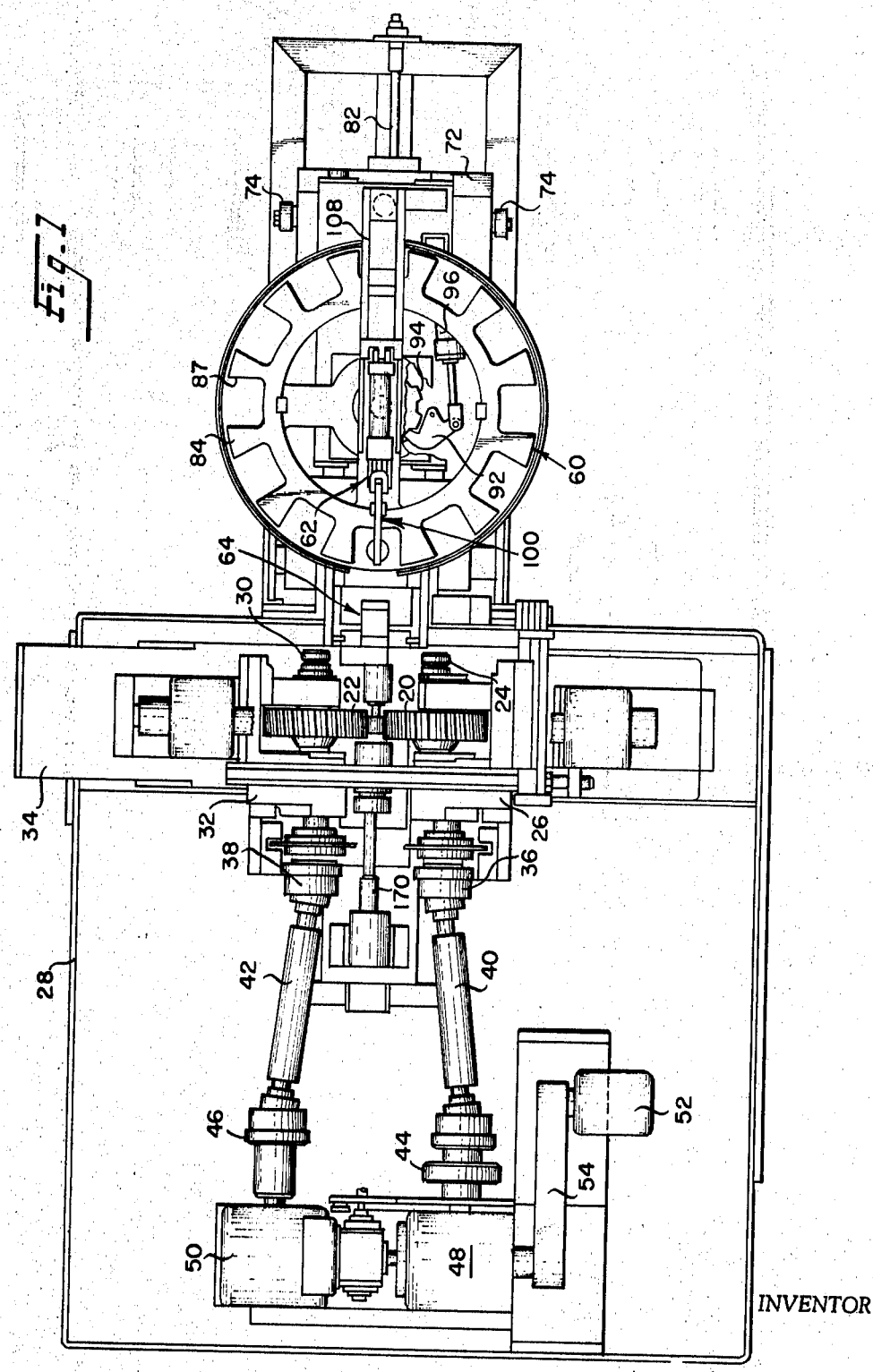
FIG. 1 is a top plan view of the work transfer apparatus and the associated rolling mechanism.

For present purposes, the work feeding and transfer mechanism of the present invention will be illustrated in connection with a gear rolling apparatus of the type disclosed in the aforementioned application Ser. No. 618,750, to which reference may be made for details of construction.

In general, the apparatus is of the infeed type in which a workpiece is operated on simultaneously by a pair of opposed identical dies 20 and 22 rotating in the same direction. In the illustrated embodiment of the invention the axis of die 20 is fixed and the axis of the opposed die 22 is laterally shifted between the rolling position shown and a retracted position to permit the removal of the finished workpiece and the positioning of the next piece to be rolled. The die 20 is mounted on a shaft 24 rotatably supported by suitable bearing structure 26 carried by the main machine bed 28. The opposed die 22 is mounted on a shaft 30 supported in a bearing assembly 32 reciprocated by a hydraulic cylinder assembly indicated generally at 34.

The dies 20 and 22 are driven in synchronism in the same direction by a conventional drive mechanism including couplings 36 and 38, telescoping shafts 40 and 42, and couplings 44 and 46 connected to the output shaft of gear boxes 48 and 50 driven in conventional manner by a motor 52 through a belt 54.

The mechanism thus far described is essentially conventional in construction and operation.

The present invention is concerned primarily with apparatus for delivering workpieces to the working station between the rolls 20 and 22, holding the workpiece at the station during the rolling operation and thereafter removing the workpiece for delivery to a convenient storage or collection point. The principal components of this apparatus, which will be described in greater detail below, are a turret assembly, indicated generally at 60, to which the workpieces to be rolled are supplied and from which the finished workpieces are removed manually; first transfer mechanism indicated generally at 62 for transferring workpieces between the turret assembly and a second work transfer assembly indicated generally at 64. The workpieces are carried from the transfer mechanism 64 to the rolling station and back to the transfer mechanism 64 by a turret assembly indicated generally at 66 having a single arbor assembly 68. As explained in detail in the aforesaid copending application Ser. No. 618,750 the center of the workpiece is shifted laterally during the operation. Accordingly, the turret assembly 66 and the second transfer mechanism 64 are mounted for corresponding lateral shifting movement on a slide assembly 70, suitably supported on the main machine base 28.

The turret assembly 60 and the first transfer assembly 62 are carried on a separate base assembly 72 supported by rollers 74 on the upper surface of the machine bed 28. Normally the base 72 is stationary during the operation of the mechanism, the rollers 74 being provided to facilitate movement of the base, the turret assembly 60 and the transfer assembly 62 away from the mechanism to facilitate adjustments of the main rolling mechanism or replacement of the dies.

The base assembly 72 is connected to the slide assembly 70 by a tie rod 76 pivotally connected as at 78 to the slide assembly 70 and extending through the body of the base 72 for pivotal connection to the latter as at 80, the connection at 80 and an adjusting rod 82 also providing for precision adjustment of the position of the base 72 to assure proper cooperation between the transfer mechanisms 62 and 64.

Figure 2:
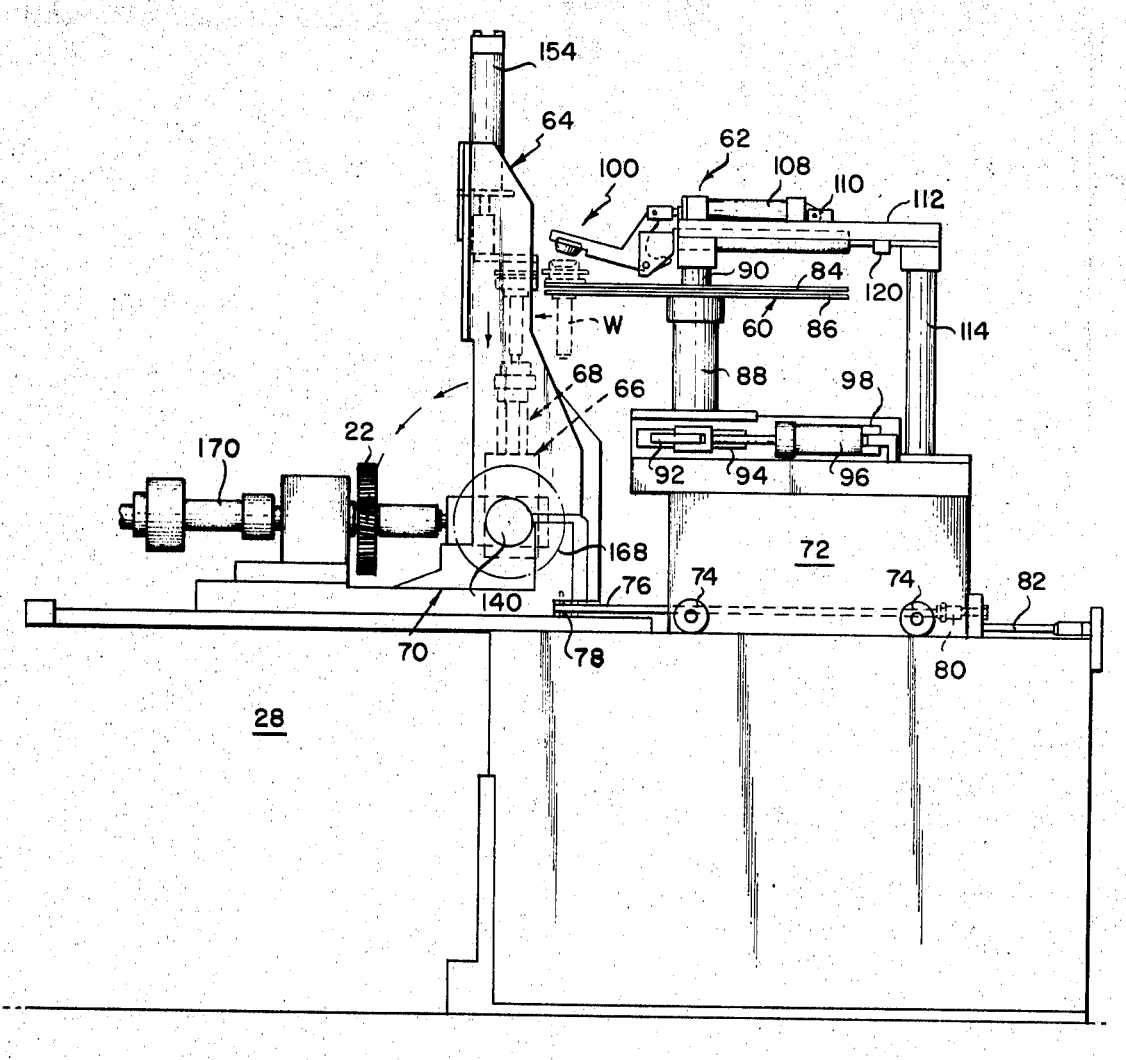
FIG. 2 is a side elevation of the work feeding and transfer mechanism and a portion of the associated rolling apparatus the latter being shown diagrammatically.

The turret assembly 60 comprises a pair of spaced plates 84 and 86 having a plurality of peripheral notches 87 adapted to receive the elongated body portion of the workpieces W, the lands between the notches supporting the enlarged upper ends of the workpieces. The plates 84 and 86 are carried by a collar 88 rotatable on a fixed column 90 projecting upwardly from the base 72. The turret assembly 60 is indexed to bring successive ones of the notches 87 in position beneath the operating portion of the transfer mechanism 62 by a pawl 92 engageable with a toothed wheel 94 rigid with the lower end of collar 88, the pawl being operated by a pneumatic piston cylinder assembly 96 pivotally carried by the base assembly 72 as at 98. The first transfer mechanism 62 includes a finger assembly 100 adapted to engage the workpiece W and transfer it laterally to the second transfer mechanism 64 and subsequently to transfer a finished workpiece from the transfer mechanism 64 to the turret assembly 60. The finger assembly 100, the free end of which carries a fitting 102 adapted for engagement with the upper end of the workpiece W is pivotally mounted on the end of a slide assembly 104 by a pivot pin 106. The finger assembly is swung between the full and dotted line position shown in FIG. 3 and advanced and retracted by a pneumatic cylinder 108, one end of which is pivotally mounted as at 110 on an upper frame assembly 112 carried by the upper end of the column 90 and a corresponding column 114 projecting upwardly from the rear of the base 72. The slide assembly 104 is mounted for sliding movement along suitable ways, not shown, provided in the upper frame member 112. The cylinder 108, the piston rod 116 of which is pinned as at 118 to the finger 100, is effective to move the finger and the slide assembly to the right as viewed in FIG. 2 against a stop 120 and thereafter elevate the finger to the full line position shown in FIG. 3. On the advance stroke the finger 100 is first depressed to the dotted line position of FIG. 3. The finger and slide are then advanced to a position in registry with the transfer mechanism 64. To assure the sequential action, the finger 100 is biased to the dotted line position of FIG. 3 by a plunger 121 carried by the slide 104 and urged by a spring 122 against an arcuate surface 124 on the finger. Accordingly, when the piston rod 116 is advanced the finger 100 will first be moved from the full line position to the dotted line position of FIG. 3 to dispose a stop surface 126 against the undersurface of the slide 104 and only after this motion is completed will translation of the finger and the slide begin. Conversely, when the piston rod 116 is retracted, the spring 122 and the plunger 121 will prevent elevation of the finger until after the slide assembly 104 has been fully retracted against the stop 120.

Referring now to FIGS. 4, 5, and 6, the second transfer mechanism 64 comprises upper and lower frame members 130 and 132 secured together by cap screws 134, the lower frame member being suitably secured to the slide assembly 70. At their juncture, the upper and lower frame members provide a pair of trunnion bearings 136 in which the shaft 140 of the turret assembly 66 is supported. The upper frame structure 130 is of generally U-shaped configuration having a backwall 142 and sidewalls 144 and 146. The portion of the frame structure opposite the backwall 142 is open to permit the turret-arbor assembly to swing between the two positions shown in FIG. 2.

Mounted for vertical movement on opposed ways 148 formed in the upper portion of the upper frame member 130 is a slide assembly 150, the lower portion of which is formed as a pair of opposed jaws 152, dimensioned to receive the upper enlarged portion of the workpiece. It will be appreciated that the jaws 152 are removable to permit replacement by jaws having configurations to accommodate other types of workpieces. The slide assembly 150 is moved between its upper and lower positions by a hydraulic cylinder 154, the piston rod 156 of which is adjustably secured to tee slide assembly as at 158. Also carried by the slide assembly 150 are a pair of plungers 160 which are normally urged to the position shown in FIG. 5 by a pair of associated springs 162. The plungers 160 are held against outward movement by a pair of screws 164. When the slide reaches its lowermost position, the plungers 160 contact adjustable stop members 166 to partially compress the springs 162. When, at the conclusion of the downward movement of the slide assembly, the pressure in the hydraulic cylinder 154 is relaxed, the springs 162 will raise the jaw members 152 slightly to facilitate movement of the workpiece into and out of the jaws.

The turret assembly 66 and the associated arbor 68 may be of the same construction as the corresponding components disclosed in the aforesaid copending application Ser. No. 618,750, except that the mechanism is modified to include only one such arbor and the arbor is elongated to accommodate the correspondingly elongated workpiece. A reversible motor, not shown, is suitably connected to the turret assembly 66, the drive being arranged to oscillate the turret assembly and the associated arbor between the two positions shown in FIG. 2, the dotted line position being the loading and unloading position and the full-line position being the working or rolling position. It will be understood that conventional hydraulic, pneumatic and electrical circuitry will be employed to assure sequential operation of all the components of the apparatus in properly timed relation. In the at rest position of the mechanism the first transfer assembly 62 will occupy the position shown in FIG. 2; the slide assembly of the second transfer mechanism 64 will be in its raised position as shown in FIG. 5; the turret-arbor assembly will be in the vertical position shown in dotted lines in FIG. 2, and the dies 20 and 22 will be separated. Initially the rotary plate assembly 60 will be loaded with 12 workpieces. The loading will be accomplished manually in the embodiment shown although the mechanism can be readily adapted to automatic feeding.

After the mechanism has been loaded, the operator will start the mechanism and in the normal cycle of operation the motor 108 will be energized to lower the finger 100 into firm engagement with a workpiece and thereafter advance the finger and the associated slide to transfer the workpiece from the rotary plate assembly 60 to the jaws 152 of the second transfer mechanism 64. While the finger 100 and the slide 104 remain in their advanced position the cylinder 154 is actuated to lower the jaws 152 carrying the workpieces to deposit the workpiece on the arbor assembly 68. The cylinder 154 is then deenergized to permit the jaws 152 to be raised slightly to free the workpiece. Thereafter, the turret assembly 66 is swung to dispose the arbor and the workpiece to the rolling position between the dies 20 and 22. The workpiece is then engaged by the prerotation mechanism 170 described in detail in Ser. No. 618,750 and the die 22 is advanced toward the die 20 to perform the rolling operation. A suitable motion transfer mechanism is provided, as described in detail in application Ser. No. 618,750 to displace the slide assembly 70, the entire transfer mechanism 64 the turret assembly 66 and the workpiece toward the die 20 a distance equal to half the displacement of the die 22. At the completion of the rolling operation the die 22 is retracted from the slide assembly and the associated components are restored to their initial position.

The turret assembly 66 is then swung to the vertical position to dispose the finished workpiece within the jaws 152. The cylinder 154 is then energized to raise the jaws and workpiece into contact with the end of the finger 100 which is then withdrawn to the right by operation of the motor 108 to reposition the finished workpiece on the rotary plate assembly 60. The finger 100 is then lifted, as described above, to clear the workpiece and the rotary table 60 is indexed to move the next workpiece beneath the end of the finger 100. In the succeeding indexing movements of the table 60 the finished workpieces are carried to a point where they can be manually or automatically removed and replaced with unfinished workpieces.

By the use of appropriate controls the mechanism can be arranged to operate continuously or to perform a batch operation i.e. to stop automatically at the completion of rolling a given number of workpieces.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for delivering workpieces to and removing workpieces from a working position comprising a mandrel assembly adapted to support a workpiece, means mounting said mandrel assembly for swinging movement between an essentially horizontal position to dispose a workpiece thereon at said working position and an essentially vertical position to dispose a workpiece thereon at a loading and unloading station, a claw assembly mounted for essentially vertical displacement above said station and adapted, upon downward vertical movement, to deposit a workpiece upon said mandrel assembly and upon upward vertical movement to remove a workpiece from said mandrel assembly, a turret assembly mounted for rotation about an essentially vertical axis, said turret assembly having a plurality of spaced workpiece-supporting formations, means for incrementally rotating said turret assembly to dispose successive ones of said formations adjacent said claw assembly, and means for displacing a workpiece supported on one of said formations on the said claw assembly and for subsequently removing said workpiece from said claw assembly for return to said formation.